United States Patent [19]

Kanengieter et al.

[11] 4,099,364
[45] Jul. 11, 1978

[54] FLUFFER SHIELD SYSTEM FOR CROP HARVESTER

[75] Inventors: Glenn G. Kanengieter, Blooming Prairie; Frank C. Krumholz, Owatonna, both of Minn.

[73] Assignee: Owatonna Manufacturing Company, Inc., Owatonna, Minn.

[21] Appl. No.: 738,852

[22] Filed: Nov. 4, 1976

[51] Int. Cl.² ........................................... A01D 57/26
[52] U.S. Cl. ........................................... 56/1; 56/192
[58] Field of Search ............... 56/DIG. 1, 1, 14.4, 56/192

[56] References Cited

U.S. PATENT DOCUMENTS

| 2,915,869 | 12/1959 | Coultas ........................... 56/DIG. 1 |
| 3,241,300 | 3/1966 | Fell et al. ........................... 56/153 |
| 3,680,291 | 8/1972 | Laverne ........................... 56/1 |
| 3,683,602 | 8/1972 | Scarnato et al. ........................... 56/14.4 |

Primary Examiner—Russell R. Kinsey
Attorney, Agent, or Firm—Merchant, Gould, Smith, Edell, Welter & Schmidt

[57] ABSTRACT

A plurality of fluffer shields mounted in generally end-to-end relationship on the frame of a crop harvester and conditioner. Each fluffer shield is pivotally adjustable independently of the other shields to control the rearward movement of portions of the cut crop delivered rearwardly of the harvesting machine by the crop conditioner rolls of the machine, so as to control the cross-sectional shape and density of a windrow produced by the machine.

4 Claims, 6 Drawing Figures

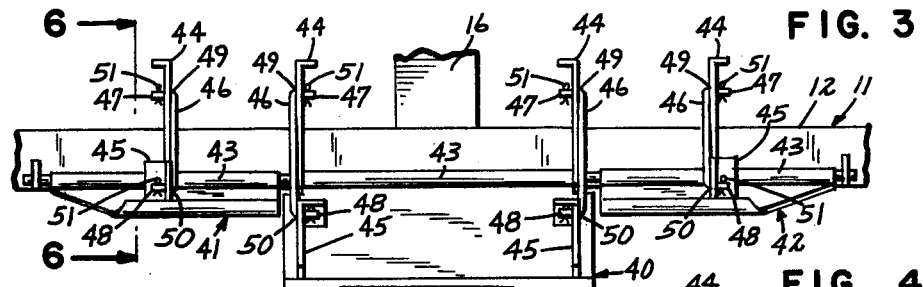
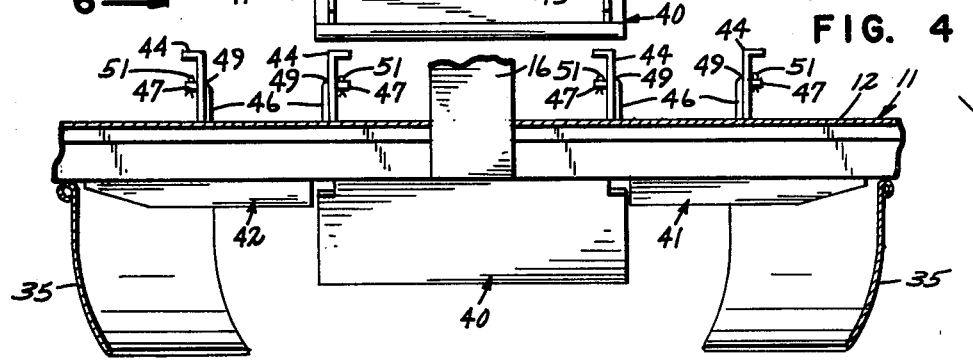
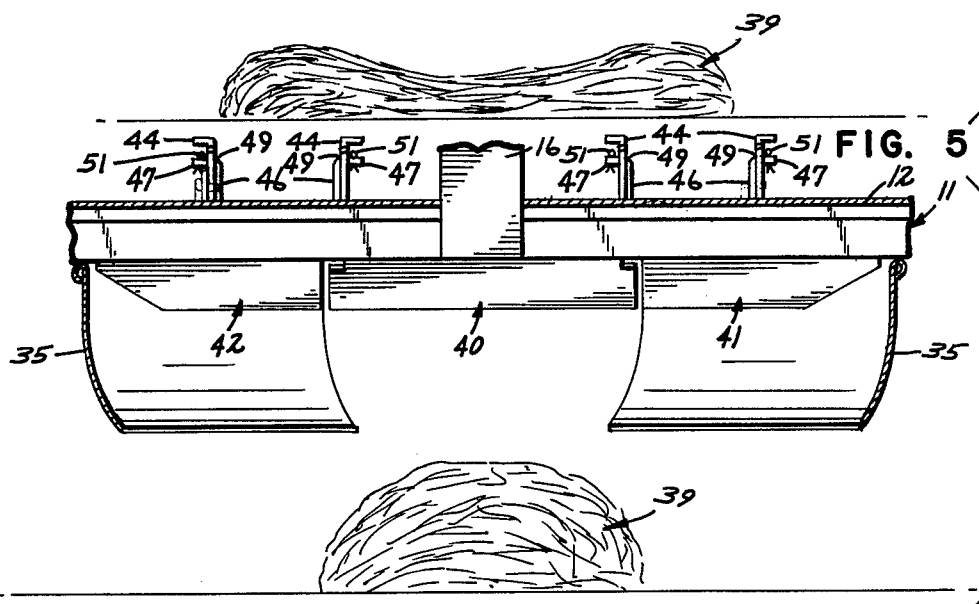
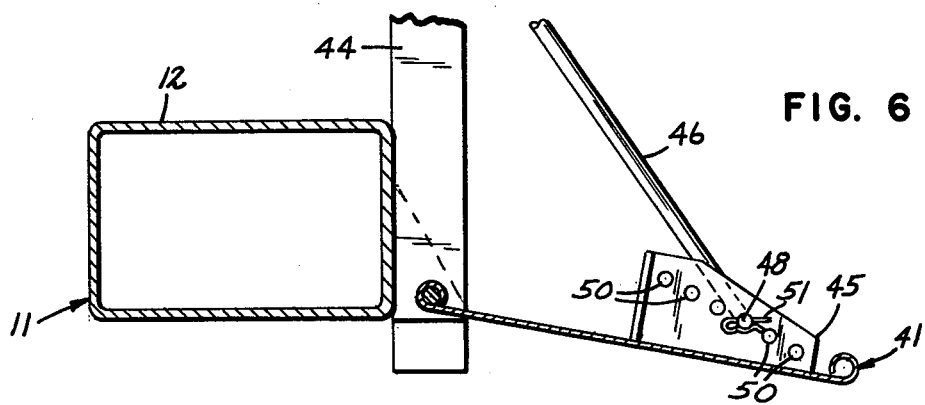

4,099,364

FLUFFER SHIELD SYSTEM FOR CROP HARVESTER

BACKGROUND OF THE INVENTION

This invention relates generally to crop harvesting implements, and more particularly to improvements in such implements for cutting and conditioning the cut crop and depositing the conditioned crop on the ground in a windrow where it may be properly cured. After curing, the windrowed crop is, in many cases, formed into bales, either rectangular or cylindrical. In the forming of cylindrical bales, the crop is picked up in its windrowed state and rolled into cylindrical shape by suitable bale rolling mechanism. Usually, swaths or windrows of cut crop are taller at their central portions than at the opposite side edges of the windrow. Then, when the material is rolled into a bale, the bale is more dense in the central portion, axially of the bale, than at the opposite ends of the bale, and more difficult to stack with other like bales, than is the case with rectangular bales which are of substantially equal density throughout.

The improved structure of this invention operates to impart different desired shapes to windrows as they are formed, to provide for varying curing conditions and to enable the material to be adapted for easy forming into bales of different shapes, such as rectangular or cylindrical.

SUMMARY OF THE INVENTION

As applied to a crop harvesting machine including, a mobile frame elongated in a direction transversely of the direction of travel of the machine, a mower, and crop conditioner rolls extending longitudinally of said frame, said rolls being operative to deliver cut and conditioned crop rearwardly of the direction of travel of the machine; this invention is in the nature of an improvement comprising, a plurality of cooperating fluffer shields having front and rear edges and disposed in a group extending transversely of the direction of machine travel. Means is provided pivotally mounting each of said fluffer shields to said frame for swinging movements on a horizontal axis extending transversely of the direction of said machine travel and independently of the others of said fluffer shields, and support means releasably holds each of said shields in desired set positions of said swinging movement thereof.

BRIEF DESCRIPTION OF THE DRAWINGS

FIG. 3 is a fragmentary view in rear elevation, taken on the line 3—3 of FIG. 2;

FIG. 4 is a fragmentary view as seen from the line 4—4 of FIG. 2;

FIG. 5 is a view corresponding to FIG. 4, but showing a different position of some of the parts; and FIG. 6 is an enlarged fragmentary section taken on the line 6—6 of FIG. 3.

DETAILED DESCRIPTION OF THE PREFERRED EMBODIMENT

Figure 1:
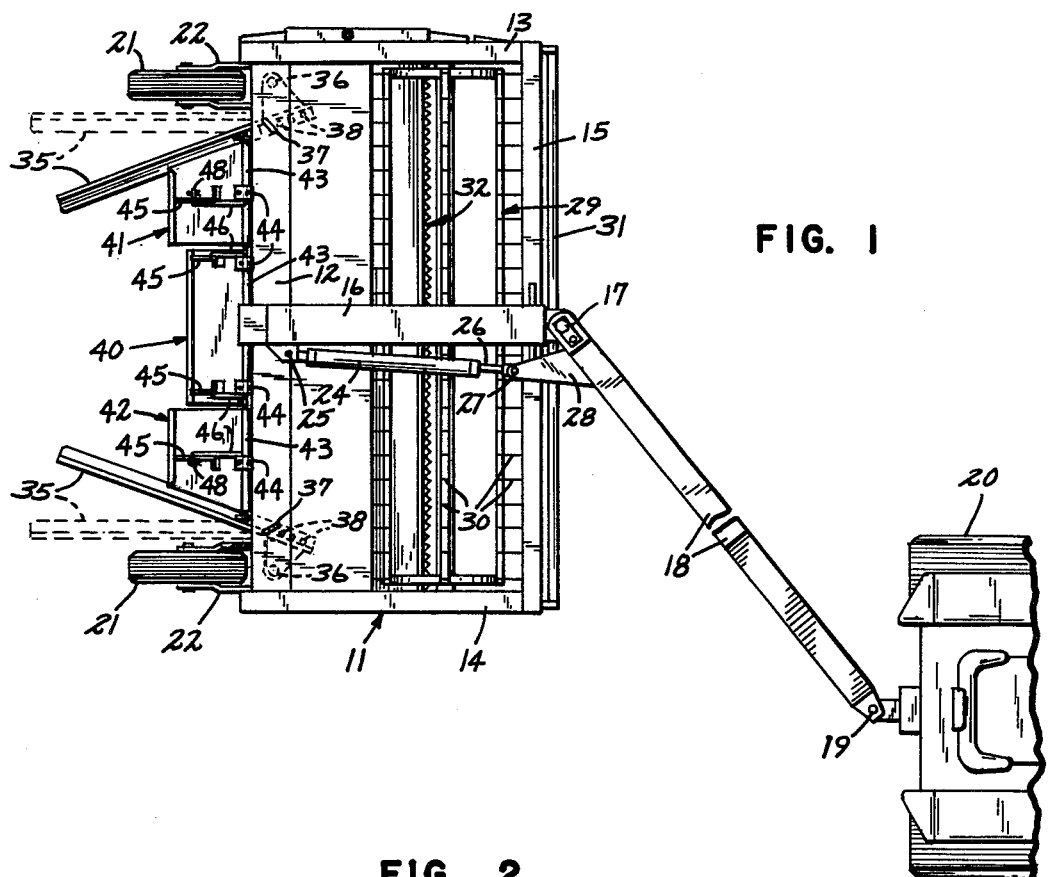
FIG. 1 is a view in plan of a crop harvesting machine, commonly known as a swather, shown as being pulled by a tractor, the tractor being shown fragmentarily.
Figure 2:
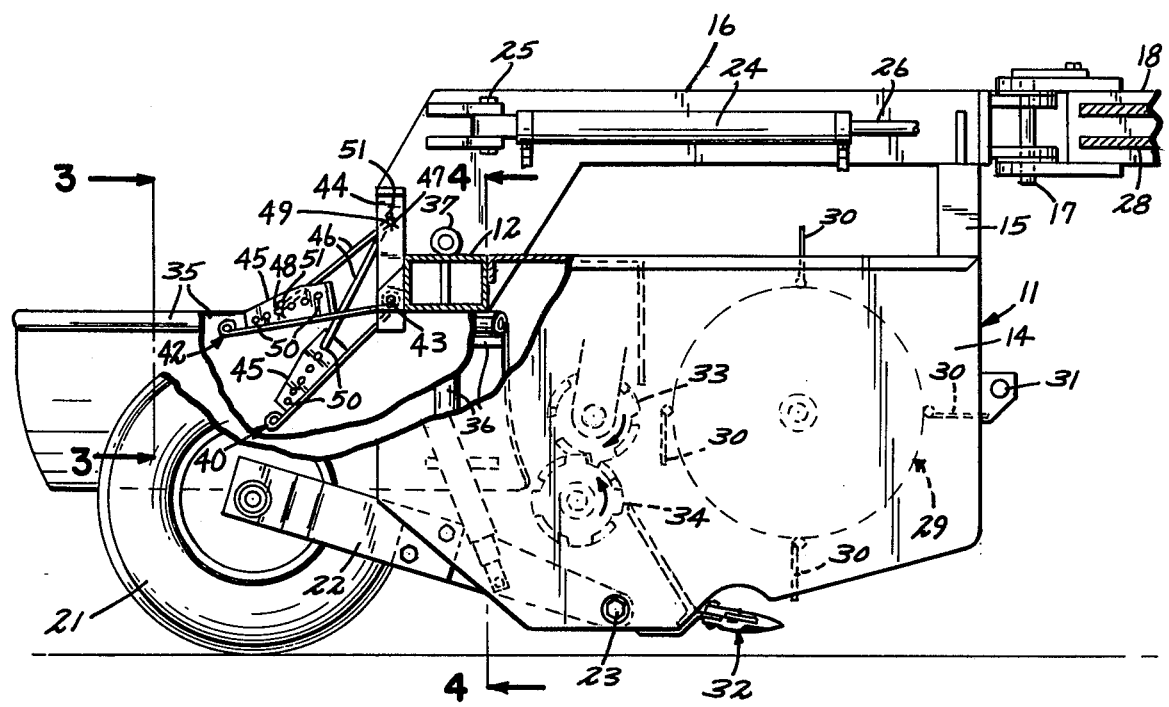
FIG. 2 is an enlarged fragmentary view in side elevation of the swather of FIG. 1, some parts being broken away and some parts being shown in section.

In the drawings, a swather is shown as comprising a frame structure 11 that is elongated in a direction transversely of the intended direction of travel of the swather, the frame 11 comprising an elongated rigid tubular frame member 12, side frame members 13 and 14, a front frame member 15 and a central frame member 16 connected to the frame members 12 and 15 and being pivotally connected at its front end, as indicated at 17 to the rear end of a draft tongue 18. The draft tongue 18 is pivotally connected at its front end, as indicated at 19, to the drawbar of a commercially available tractor shown fragmentarily in FIG. 1 and indicated at 20. The swather is supported by a pair of laterally spaced pneumatic tire-equipped wheels 21 suitably journaled at the rear ends of bifurcated mounting arms or brackets 22 pivotally connected to the frame 11, as indicated at 23 in FIG. 2. A pair of fluid pressure cylinders 22a, one of which is shown in FIG. 2, and operatively connected to the brackets 22, and may be assumed to be connected to the frame 11 in the usual well known manner, for raising and lowering the swather with respect to the ground. The draft tongue 18 is adapted to be disposed in different angular positions relative to the swather by means of a fluid pressure cylinder 24 having a closed end pivotally connected to the central frame member 16, as indicated at 25, and a cooperating piston rod 26 extending from the opposite end of the cylinder 24 and pivotally connected, as at 27 to a bracket portion 28 of the draft tongue 18.

The swather further includes a feeding reel 29 equipped with groups of feeding tines 30 and suitably journaled in the side frame members 13 and 14, a customary push bar 31 disposed forwardly of the reel 29, a mower assembly 32 underlying the reel 29, and a pair of upper and lower crop conditioner rolls 33 and 34 respectively suitably mounted at their opposite ends in the side frame members 13 and 14.

The mechanism of the swather so far described, is well known, and, in and of itself, does not comprise the instant invention. Hence, further detailed showing and description thereof is omitted, in the interest of brevity. It should suffice to state that the reel 29 is rotated in a clockwise direction with respect to FIG. 2 to feed material to the mower assembly 32 and from thence to the conditioner rolls 33 and 34. The conditioner rolls 33 and 34 rotate in directions, indicated by arrows in FIG. 2 to pass the cut crop rearwardly therebetween, so that the crop cut by the mower assembly 22 and conditioned by the rolls 33 and 34 is discharged upwardly and rearwardly from the rolls as the machine is pulled through a field by the tractor 20.

For the purpose of forming a windrow and controlling the width thereof, a pair of windrow forming shields 35 are shown as being pivotally secured to the frame 11, as indicated at 36. As shown in FIG. 1, the windrow forming shields 35 are movable between directly rearwardly extended positions, shown by dotted lines, and rearwardly converging positions shown by full lines, the shields being releasably secured in desired ones of such positions by suitable means, such as locking pins or screws 37 extending through the frame member 12 and given ones of spaced openings 38 in the front end portions of the shields 35. The angular positions of the shields 35 determine the width of a windrow formed by the machine as it travels through a field. In FIGS. 4 and 5, a windrow is indicated at 39.

A plurality of fluffer shields are used in combination with the windrow forming shields 35 to determine the cross-sectional shape of the windrow 39 of cut crop delivered by the conditioning rolls 33 and 34. The fluffer shields involve an intermediate shield 40 and a pair of outer fluffer shields 41 and 42, these being disposed in end-to-end relationship with opposite ends of the intermediate shield 40. The fluffer shields 40–42 have front edge portions that are pivotally secured to the rear portion of the rear frame member 12 by suitable means, such as hinges 43 for swinging movements on aligned generally horizontal axes extending transversely of the direction of movement of the swather. As shown, the fluffer shields 40–42 extend generally rearwardly from the frame member 12 between the windrow forming or end shields 35. Means for releasably holding each of the fluffer shields 40–42 in desired set positions of upward and downward swinging movements thereof comprises pairs of brackets 44 and 45, for each of the fluffer shields 40–42. The brackets 44 are secured to the rear portion of the frame member 12 and extend upwardly therefrom, the brackets 45 being elongated in a direction transversely of their respective fluffer shields and projecting upwardly therefrom. Each of the fluffer shields is provided with one of a plurality of support arms 46 each having inturned or angularly disposed opposite ends 47 and 48, the former of which is pivotally received in a transverse opening 49 in a respective one of the brackets 44. The opposite inturned end of each support arm 46 is pivotally received in a selected one of a plurality of spaced openings 50 in a respective one of the brackets 45. As shown in FIG. 6, the inturned ends of the support arms 46 may be provided with suitable clips or like fasteners 51 for releasably holding the support arms 46 in engagement with their respective brackets 44 and 45.

By placing the lower inturned ends 48 of the support arms 46 in different ones of the bracket openings 50, each fluffer shield may be supported at a different angle of its swinging movement from that of the others of the fluffer shields. During travel of the machine through a field, and rotation of the conditioner rolls 33 and 34, the cut crop is fed between the conditioner rolls 33 and 34 and propelled thereby rearwardly and upwardly toward engagement with the shields 40, 41 and 42. As shown particularly in FIGS. 2–4, the outer shields 41 and 42 are disposed at a very slight angle sloping downwardly from the horizontal, while the intermediate fluffer shield 40 is angularly downwardly spaced from the outer shields 41 and 42. This arrangement causes the cut crop that impinges on the intermediate fluffer shield 40 to fall therefrom downwardly toward the ground in a more fluffy or less compacted condition than that portion of the discharged crop which strikes the outer fluffer shields 41 and 42, this latter portion of the cut crop falling to the ground behind the machine in a more compact condition. In this manner, the portions of the windrow 39 adjacent the side edges thereof are more closely packed than the central portion. As above indicated, the width of the windrow is determined by the angular relationship of the windrow forming shields 35 with respect to the direction of movement of the machine through the field. In the form of windrow shown in FIG. 4, the more densely packed edge portions of the windrow which is shown as being thicker than the fluffed central portion due to the action of the forming shields 35, cures or dries at a slower rate than the fluffier less compact central portion, which is a desirable end with some types of crops. This type of windrow also tends to roll up in a cylindrical bale which keeps its cylindrical shape more easily and longer than bales made from windrows of the type shown in FIG. 5.

The windrow 39 shown in FIG. 5 is formed by disposing all of the fluffer shields 40, 41 and 42 at a common angle, and disposing the forming shields 35 at angles such as shown by full lines in FIG. 1. By varying the angles of the fluffer shields 40–42, the height and density of the windrow 39 may be varied to suit the curing needs of various crops. When it is desired to change the angular positions of the fluffer shields 40–42, it is only necessary to remove the locking pins 51 from the lower inturned ends 48 of the support arms 46, remove the lower ends 48 from engagement with their respective brackets 45, replace said lower ends 48 in a desired one of the openings 50, and reapply the locking pins 51 to the lower ends 48.

It will be appreciated that the fluffer shields 40–42 may be used with or without the farming shields 35 depending upon the width of windrow desired. It will be further appreciated that while the fluffer shields are shown mounted on a pull type swather, they will operate just as well on push type or self-propelled swathers, not shown.

While a preferred embodiment of the improved fluffer shield arrangement of this invention has been herein disclosed, it will be understood that the same is capable of modification without departure from the spirit and scope of the invention, as defined in the claims.

We claim:

1. In a crop harvesting machine including a mobile frame elongated in a direction transversely of the direction of travel of the machine, a mower, and crop conditioner rolls extending longitudinally of said frame, said rolls being operative to deliver cut and conditioned crop rearwardly of the direction of travel of the machine; the improvement comprising, a plurality of cooperating fluffer shields having front and rear edges and disposed in a group extending transversely of the direction of travel of the machine, means pivotally mounting each of said fluffer shields to said frame for swinging movements on a horizontal axis extending transversely of the direction of the machine travel and independently of the others of said fluffer shields, a plurality of support arms at least one for each of said fluffer shields, and a plurality of brackets, one pair for each of said support arms, one bracket of each pair being mounted on said frame and the other on a respective one of said fluffer shields, each of said support arms having one end pivotally secured to one of the brackets of its respective pair and secured at its other end to a selected one of a plurality of spaced points on the other bracker of its respective pair thereof.

2. The crop harvesting machine defined in claim 1 in which said support arms have inturned opposite ends, one of the brackets of each pair thereof having an opening for pivotal reception of one of said inturned ends of a respective support arm, the other bracket of each pair thereof having a plurality of openings spaced apart generally in the direction of movement of the machine and each capable of pivotally receiving the opposite inturned end of said respective support arm.

3. In a crop harvesting machine including a mobile frame elongated in a direction transversely of the direction of travel of the machine, a mower, and crop conditioner rolls extending longitudinally of said frame, said rolls being operative to edliver cut and conditioned crop rearwardly of the direction of travel of the machine; the improvement comprising, a plurality of cooperating fluffer shields having front and rear direction of travel of the machine, means pivotally mounting each of said fluffer shields to said frame for swinging movements on a horizontal axis estending transversely of the direction of the machine travel and independently of the others of said fluffer shields, a plurality of support arms, at least one for each of said fluffer shields, means operatively pivotally connecting each of said arms at one end to said frame, and brackets on said fluffer shields, each of said support arms having its other end secured at a selected one of a plurality of spaced points on a respective one of said brackets.

4. The crop harvesting machine defined in claim 3 in which said support arms extend generally rearwardly with respect to the direction of intended travel of the machine, each of said support arms having an inturned rear end, said brackets each having a plurality of openings therein spaced apart generally in said direction of travel and each capable of pivotally receiving the inturned rear end of a respective one of said support arm.

* * * * *